United States Patent [19]

Narita et al.

[11] Patent Number: 4,824,229

[45] Date of Patent: Apr. 25, 1989

[54] MICROSCOPE WITH AUTOMATIC SWEEPING DEVICE

[75] Inventors: Hiroshi Narita; Minoru Uemura, both of Yaizu; Yoshitada Mori, Tokyo, all of Japan

[73] Assignee: Sapporo Breweries, Ltd., Tokyo, Japan

[21] Appl. No.: 141,308

[22] PCT Filed: Apr. 9, 1986

[86] PCT No.: PCT/JP86/00174

§ 371 Date: Dec. 7, 1987

§ 102(e) Date: Dec. 7, 1987

[87] PCT Pub. No.: WO87/06357

PCT Pub. Date: Oct. 22, 1987

[51] Int. Cl.$^4$ .................... G02B 21/26; G02B 21/00
[52] U.S. Cl. ............................... 350/531; 350/507; 364/181
[58] Field of Search .............. 350/507, 531, 530; 250/202; 364/181, 525

[56] References Cited

U.S. PATENT DOCUMENTS 4,000,417 12/1976 Adkisson et al. ............... 250/202
4,469,994  9/1984 Lundberg et al. ............... 364/181
4,624,537 11/1986 Hanssen et al. ................. 350/531
4,653,878  3/1987 Nakasato et al. ................ 350/507

FOREIGN PATENT DOCUMENTS 3318959 12/1983 Fed. Rep. of Germany ...... 350/507
50-30566  3/1975 Japan .
52-28341  3/1977 Japan .
1428732  3/1976 United Kingdom ............ 350/531

OTHER PUBLICATIONS

Philip G. Stein, "Image-Analyzing Microscope", *Analytical Chemistry*, vol. 43, No. 13, Nov. 1970, pp. 103-107.

*Primary Examiner*—Jon W. Henry
*Attorney, Agent, or Firm*—Oblon, Fisher, Spivak, McClelland & Maier

[57] ABSTRACT

A microscope with an automatic sweeping device which automatically sweeps a preparation, membrane filter, etc. for observing subjects, such as cells, microbes or others, existing thereon, is offered. The automatic sweeping device has the following functions: a control mechanism drives a transfer mechanism for moving a holder containing subjects according to the instructions from a control console to perform automatic sweeping by stepped or continuous movement of the holder, and at the base time a printer, memory and display are so controlled that they respectively print, store and display position and other various data. Manual operation is also possible immediately after suspension of automatic operation. Positions of subjects detected by a position detector are stored in the memory. Whenever automatic operation is restarted, the holder returns to the position where the suspension occurred, to resume sweeping operation and moves directly to a particular memorized position when a memory number is keyed in from the control console, and to a position at particular coordinates when coordinates of a position other than the memorized position are inputted from the control console.

1 Claim, 5 Drawing Sheets

MICROSCOPE WITH AUTOMATIC SWEEPING DEVICE

TECHNICAL FIELD

The invention relates to a microscope with an automatic sweeping device which automatically sweeps a preparation, membrane filter, etc. for observing subjects, such as cells, microbes or others, existing thereon.

BACKGROUND ART

The applicant has proposed a microscope with an automatic sweeping device of the kind set forth in Japanese Utility Model Application Nos. 182909/'83 and 53319/'84.

The device is constructed so that the whole area or desired regions are automatically and successively swept by each observation division, or intermittently swept at any predetermined pitch, sweeping being able to be stopped for any observation period at any location and thereafter restarted, thereby permitting the whole area or desired region to be observed perfectly and easily.

However, the microscopes with automatic sweeping devices of the prior art have a disadvantage in that a preparation, etc. must be moved using a switch on a control console for observing a particular area, the operation being correspondingly bothersome.

Later reexamination of a particular area of preparation which contains cells, blood cells, etc. of abnormal type required marking of the preparation with ink on a cover sheet and locating the abnormal cells with the aid of that marking, requiring a high degree of skill on the part of the examiner. If reexamination was conducted without using a cover sheet, adjacent groups of subjects were possibly damaged, or inconvenient means such as main and auxiliary holes on a manually handled stage had to be used.

DISCLOSURE OF INVENTION

The microscope with an automatic sweeping device of the present invention comprises:
- a holder for holding a container which contains or possibly contains subjects in a wide area;
- a transferring mechanisms for moving said holer two-dimensionally under the object lens of the microscope, including a position detector for detecting the position of the examination region of the container, and electro-magnetic clutches which are engaged for motor-driven operation and disengaged for manual operation;
- driving means including motors for driving the transfer mechanism, and a control handle for manually moving the transfer mechanism;
- a printer;
- memory means;
- display means;
- a control console; and
- control means which not only controls the driving means according to instructions from the control console to perform automatic sweeping by stepped or continuous movement of the holder, but also controls the printer, memory means and display to print, store and display position and other various data, makes manual operation possible immediately after suspension of automatic operation, stores data of the position where the suspension occurred in the memory means and returns the holder to the position where the suspension occurred to resume sweeping operation whenever automatic operation is restarted, moves the holder directly to a particular memorized position when a memory number is keyed in from the control console, and to a position at particular coordinates when coordinates of a position other than the memorized position are inputted from the control console.

Therefore, switching between automatic and manual sweeping can be accomplished easily. The device permits reexamination to be performed reliably and quickly by instantly memorizing a particular position in terms of coordinates and keying in the values of the coordinates or the memorized number at the time of reexamination. Furthermore, setting of an examination position for automatic sweeping can be performed while observing the X-Y coordinate data displayed on the position display so that any necessary examination position can easily and accurately be set.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

BEST MODE FOR CARRYING OUT THE INVENTION

An embodiment of the invention will be described hereunder with reference to the drawings.

First, a microscope body and controller 2 will be described.

Figure 1:
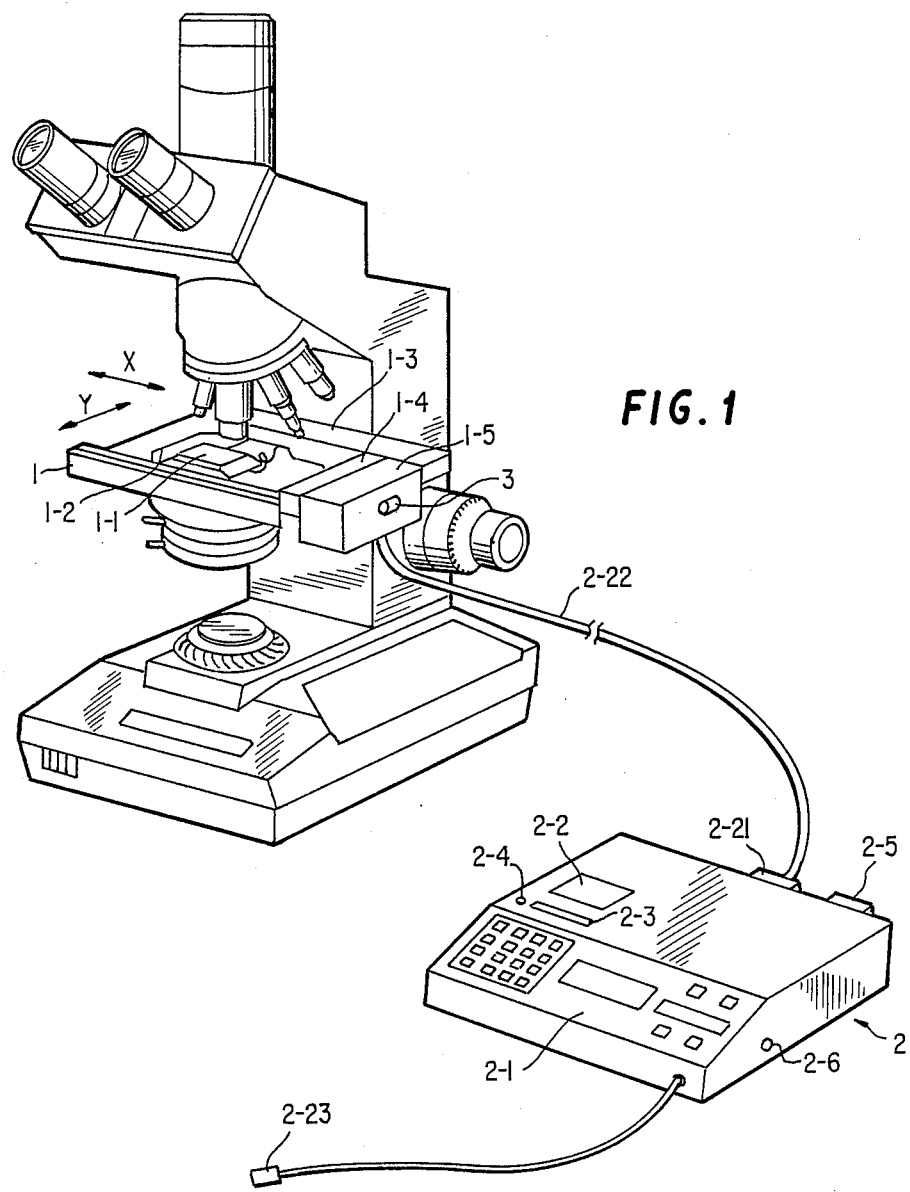
FIG. 1 is a perspective view of an embodiment of the microscope with an automatic sweeping device of the invention.
Figure 2:
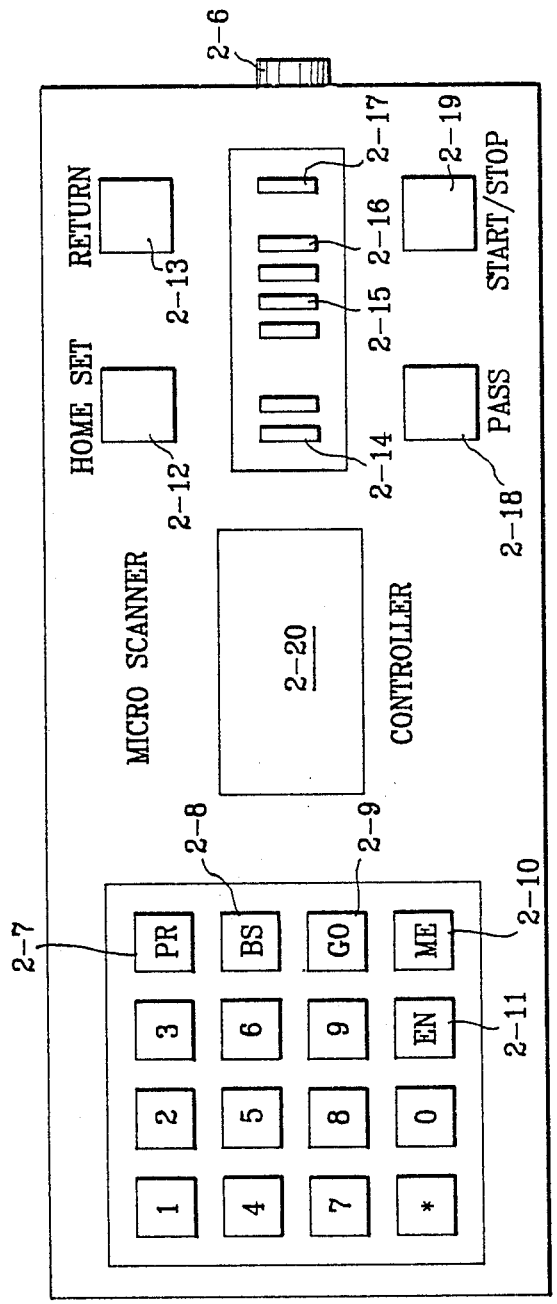
FIG. 2 is a plan view of control console 2-1.

The microscope body is provided with a holder 1-2 for holding a preparation 1-1 on a stage 1 under the object lens, an X-direction transfer mechanism 1-3 and Y-direction transfer mechanism 1-4 for transferring the holder 1-2 in X- and Y-direction respectively, and a driving means 1-5 for driving the two transfer mechanisms 1-3, 1-4. The controller 2 comprises a control console 2-1, a receptacle 2-2 for paper roll for printing, a feeder inlet 2-3 for rolled paper, a button 2-4 for feeding paper, an RS-232C connector 2-5, a stage connector 2-21, a transfer speed adjustment dial 2-6 (for speeds 0.1–8.0 mm/sec), a power switch located on the left side portion of the console, a selector switch for the direction of transfer located on the rear portion of the console, a selector switch for setting transfer step, and a foot-operated switch 2-23. The stage 1 is connected to the controller 2 by a cable 2-22. The control console 2-1 is, as shown in FIG. 2, provided with keys "0"–"9" and "*", a printing key 2-7, back space key 2-8, "go" key 2-9, memory key 2-10, entry key 2-11, display panel 2-20, home set button 2-12, return button 2-13, dial 2-14 for setting observation range in the X direction, dial 2-15 for setting observation range in the Y direction, dial 2-16 for setting a transfer step, dial 2-17 for setting suspension time, pass button 2-18, and start/stop button 2-19.

Figure 3:
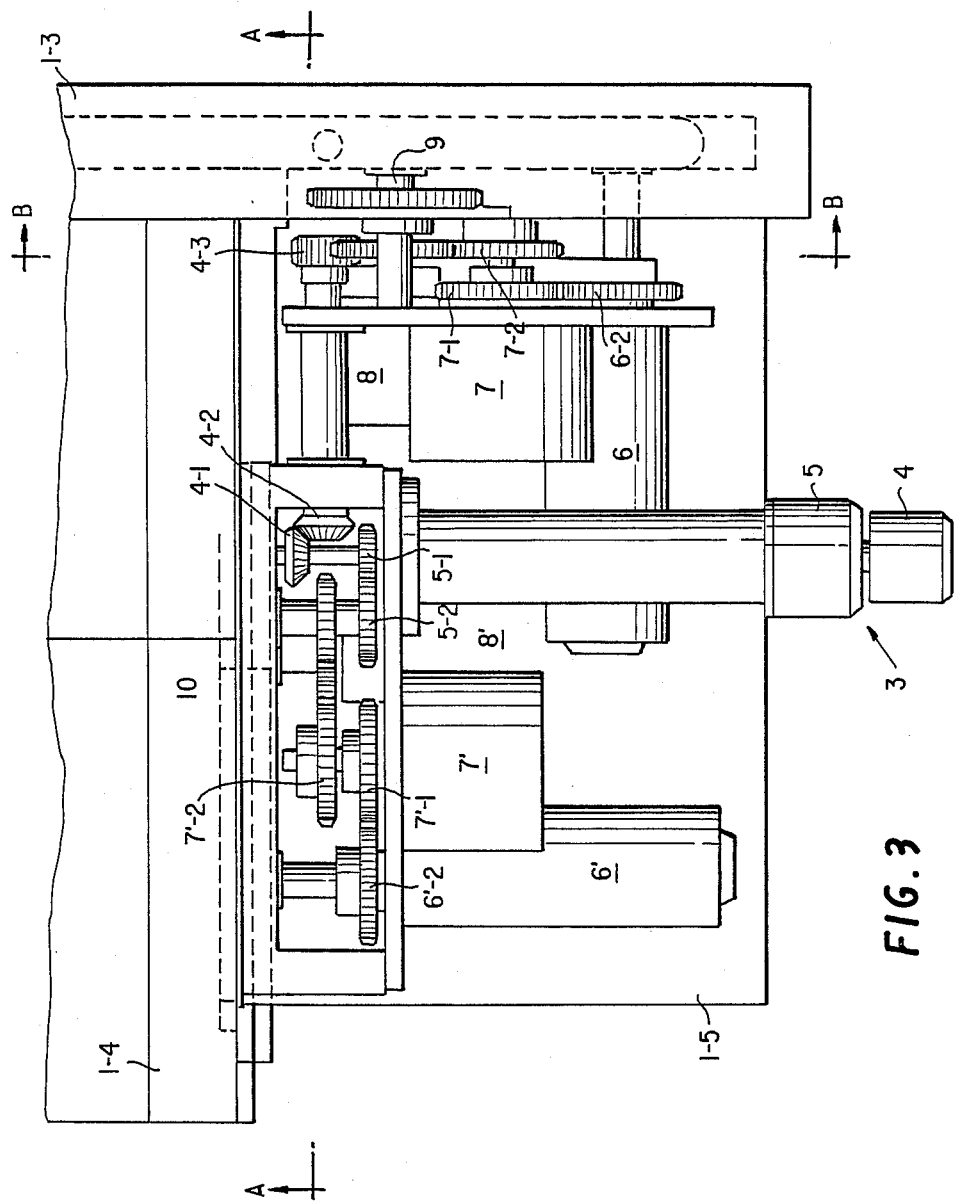
FIG. 3 is a plan view of an example of driving means shown in FIG. 1.
Figure 4:
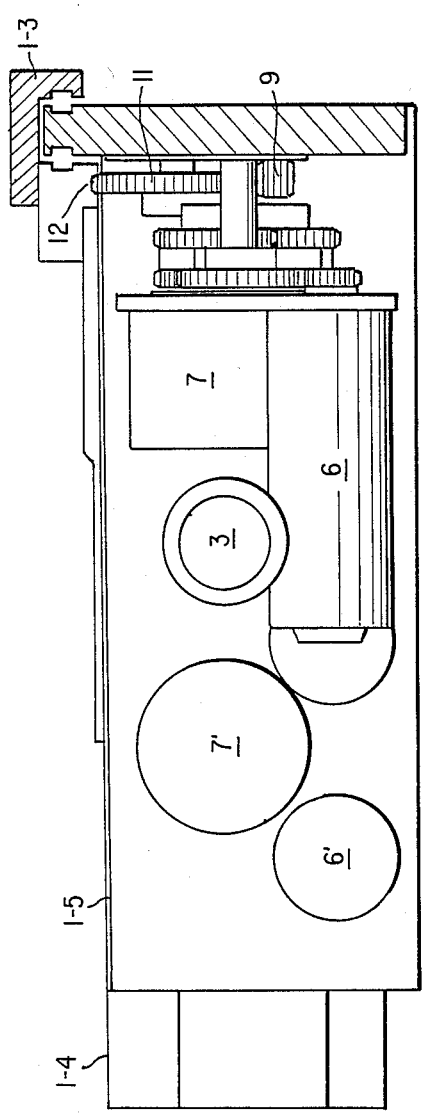
FIG. 4 is a sectional view taken along line A—A in FIG. 3.
Figure 5:
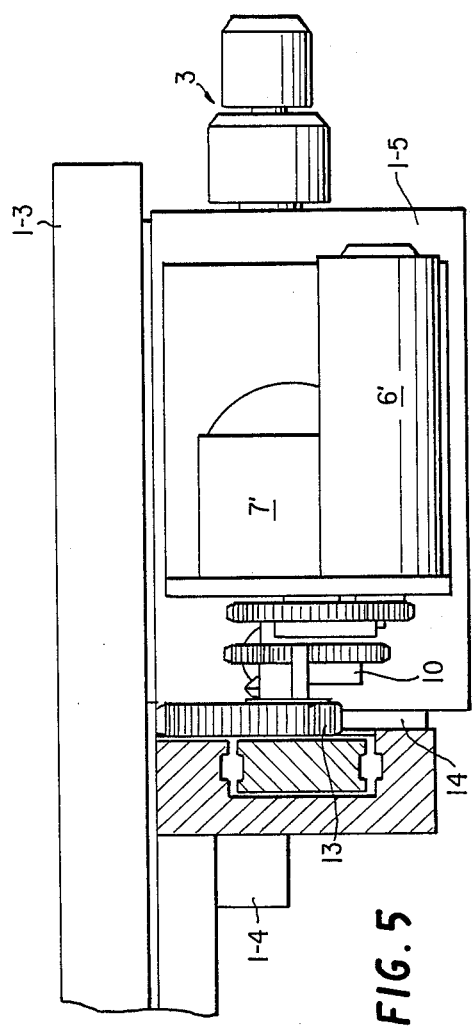
FIG. 5 is a sectional view taken along line B—B in FIG. 3.
Figure 6:
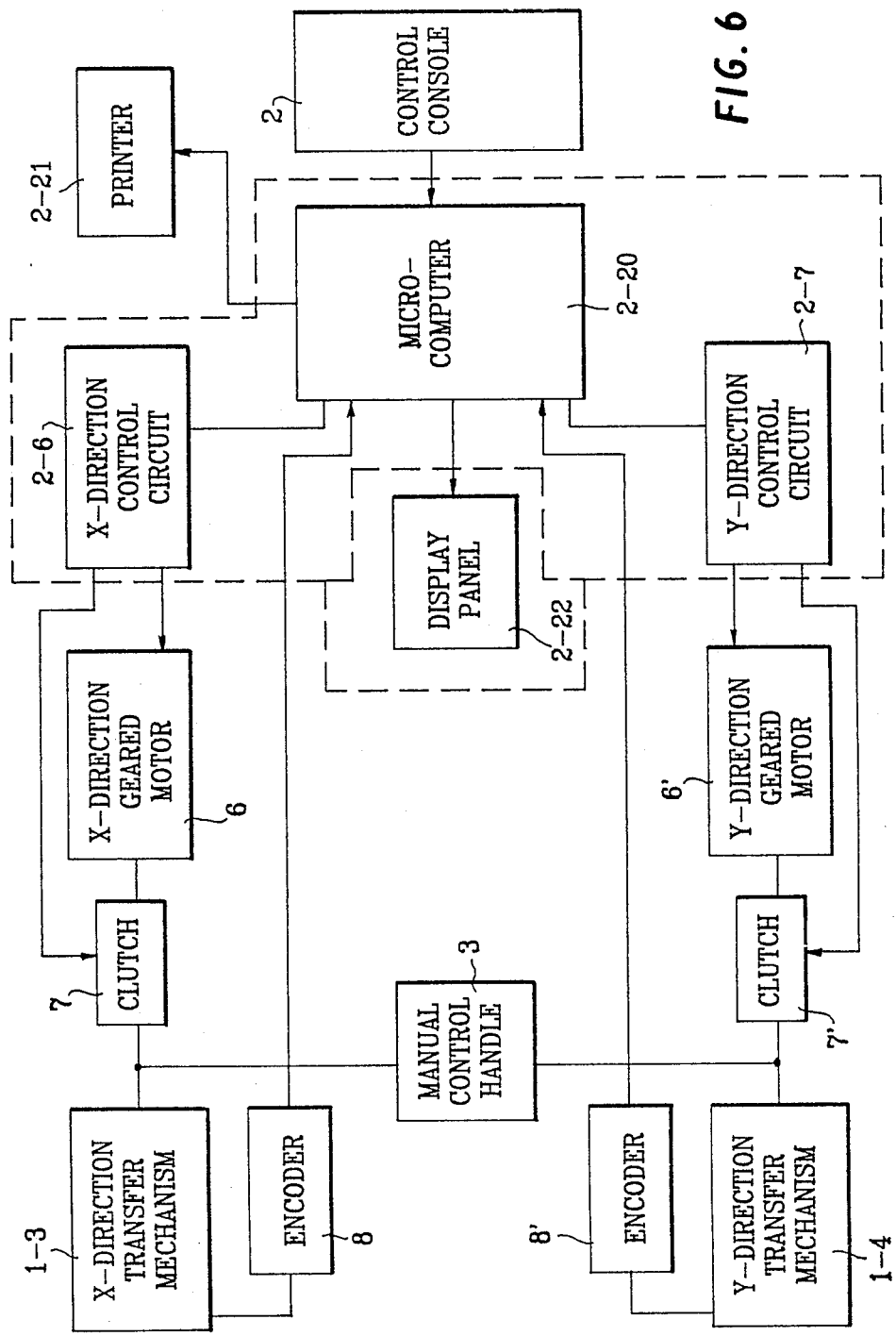
FIG. 6 is a block diagram of elements of the device.

Next, referring to FIGS. 3 through 5, the transfer mechanisms 1-3 and 1-4 and the driving means 1-5 will be described. Two geared motors 6 and 6' are for driving X-direction transfer mechanism 1-3 and Y-direction transfer mechanism 1-4 respectively. The geared motor 6 drives a drive shaft 9 to be described later through a gear (not shown), gear 6-2, gears 7-1 and 7-2 of an electro-magnetic clutch 7 to be described later, and others. The geared motor 6' drives a drive shaft 10 through a gear (not shown), gear 6'-2, gears 7'-1 and 7'-2 of a clutch 7', and others. Control handles 3 drive the transfer mechanisms 1-3 and 1-4 to manually sweep subjects to be examined, of which the inner handle 4 drives a drive shaft 9 through gears 4-1, 4-2, 4-3 etc., and the outer handle 5 drives a drive shaft 10 through gears 5-1, 5-2, etc. The aforementioned electro-magnetic clutches 7 and 7' engage or disengage respectively with the gears 7-1, 7-2 and gears 7'-1, 7'-2 by means of the start/stop button 2-19 on the controller 2. The drive shafts 9 and 10 are respectively driven by the geared motors 6 and 6' when the clutches 7, 7' are engaged, and by the control handles 4 and 5 when the clutches 7, 7' are disengaged. The drive shaft 9 engages a rack 12 provided in the X-direction transfer mechanism 1-3 through a pinion 11 to move the transfer mechanism 1-3 in the X direction, and the drive shaft 10 engages through a pinion 13, a rack 14 provided on a driving means 1-5 which is slidably fitted onto the Y-direction transfer mechanism 1-4 to move the driving mean 1-5 in the Y direction, thereby positioning to a predetermined location the holder 1-2 which holds a preparation 1-1. Encoders 8, 8' engage the drive shafts 9, 10 respectively through gears and generate pulses with the movement of transfer mechanisms 1-3, 1-4, i.e. the movement of subject to be examined, to control the geared motors 6, 6' through a microcomputer 2-20, X-direction control circuit 2-6 and Y-direction control circuit 2-7 and also digitally display the X-Y coordinates of examination location of the subject.

The microcomputer 2-20 contains a memory backed up by a battery. The memory can store date, subject number, address in terms of X-Y coordinates, classification and memory number. To store data in the memory, one may, after stopping the movement of holder 1-2 at the location where the data is to be memorized, press the memory key 2-10 to input the data and thereafter press the entry key 2-11. Among the content stored, the subject number, if once inputted, cannot be changed until returning to the absolute origin through the manipulation of pass button 2-18 and return button 2-13, or re-application of power. Location and data of examination are automatically stored. If, under a stopped condition, the "go" key 2-9 is pressed, a memory number is placed and the entry key 2-11 is pressed, then the holder 1-2 starts to move and goes directly to the location of the memory number. Or if, under the stopped condition, "*" key is pressed after "go" key is pressed, X-Y address is inputted directly through "0-9" keys, and afterward the entry key 2-11 is pressed, then the holder 1-2 moves to the X-Y address just inputted. The microcomputer 2-20 contains RS-232C software interface with general purpose computers and TTL level signal interface with other digital control devices and is adapted to be remotely controlled. Further, the microcomputer contains ROM and is adapted to permit setting of special sweeping ranges, such as circular, trapezoidal or other shapes. The printer 2-11 is used to print out various information. If the print key 2-7 is pressed after the holder 1-2 is stopped at a location where printing-out is desired, the memory number and date according to a watch contained are automatically displayed on the display panel 2-22. Thereafter, if the subject number is entered and the entry key 2-11 is pressed, the classification is displayed on the display panel 2-20. Further, if the entry key 2-11 is pressed again, then the date, subject number, X-Y address, classification and memory number are printed. After completing printing, the rolled paper may be discharged by pressing the button 2-4 and cut off. If operator wishes to stop print-out during operation, then the pass button 2-18 may be pressed. If an error is made in entering a number, the back-space key 2-8 may be pressed to erase the number. Portions printed out are stored in the memory. When the content of the memory is to be printed out, the "*" key may be pressed after the print key 2-7 is pressed, then the memory number may be entered, and after pressing the entry key 2-11, the memory number may again be entered (the memory number of the last portion is entered when plurality of portions are continuously printed out), and thereafter the entry key 2-11 may be pressed.

Now operation of the embodiment will be described hereunder.

First, the power switch is turned on. Then the stage moves to the position (absolute position), the display panel 2-11 displaying X=0.00 mm, Y=0.00 mm. If the power switch is turned on while pressing the entry key 2-11, "DATE=" is displayed on the display panel 2-22, and next, when the date and current time are entered using the ten keys and thenafter the entry key 2-11 is pressed, time matching with the internal clock is completed, and stage 1 moves to the absolute position.

(1) Incremental Advancement (stepped transfer).

Depending on the size of the sample, observation ranges in x and Y directions are set respectively by the X direction observation range setting dial 2-14 and the Y direction observation range setting dial 2-15. A transfer step is set by the transfer step setting dial 2-16, stop time is set by the stop time setting dial 2-17, and transfer speed is set by the transfer speed adjustment dial 2-6. Next, after preparation is set to the observation starting position by the control handle 3, the home set button is pressed, thereby making the observation starting position an interim position. If the direction of transfer (X or Y direction) is selected by the transfer direction selector switch and the start/stop button is pressed, then the X direction transfer mechanism 1-3 is automatically driven through the X direction control circuit 2-6, X direction general motor 6 and clutch 7 according to the aforementioned sweeping condition when the X axis has been selected for the transfer direction by the transfer direction selector switch before the power switch is turned on, or the Y direction transfer mechanism 1-4 is automatically driven through the Y direction control circuit 2-6, Y direction geared motor 6 and clutch 7 when the Y-axis has been selected for the transfer direction, thereby moving the preparation 1-1. After stopping the movement, the holder can be moved by the manual control handle.

Further, transferring can be stopped by pressing the start/stop button 2-19 again. The holder can be returned to the interim position by pressing the return button 2-13. The holder can be returned to the absolute position by pressing the return button 2-13 while pressing the pass button 2-18. It is to be further noted that the subject number and the position of the interim origin are cleared after the holder has been returned to the absolute origin using the pass button 2-18 and return button.

(2) Continuous Transfer

In the procedure of (1) Incremental Advance, if the pass button 2-18 is pressed after pressing the start/stop button 2-19 in this case, the preparation 1-1 starts continuous transfer and the subject is automatically swept so that examination is conducted throughout the entire observation area.

(3) Manual Operation

In this case, the start/stop button 2-19 is not pressed. Therefore, the electro-magnetic Clutches 7, 7' remain disengaged, and the transfer mechanisms 1-3, 1-4 are switched to manual sweeping by operating the control handle 3.

Obviously, numerous modifications and variations of the present invention are possible in light of the above teachings. It is therefore to be understood that within the scope of the appended claims, the invention may be practiced otherwise than as specifically described herein.

What is claimed is:

1. A microscope with an automatic sweeping device, comprising:

a holder for holding a container which contains or possibly contains subjects in a wide area;

transfer mechanism for moving the holder two-dimensionally under the object lens of the microscope, including a position detector for detecting the position of the examination region of the container, and electromagnetic clutches which are engaged for motor-driven operation and disengaged for manual operation;

driving means including a plurality of motors for driving the transfer mechanisms, and a control handle for manually moving the transfer mechanisms;

a printer;

memory means;

display means;

a control console; and control means which controls the printer, memory means and display means to print, store and display position and other various data, makes manual operation possible immediately after suspension of automatic operation, stores data of the position where the suspension occurred in the memory means and returns the holder to the position where the suspension occurred to resume sweeping operation whenever the automatic operation is restarted, moves the holder directly to a particular memorized position when a memory number is keyed in from the control console, and to a position at particular coordinates when coordinates of position other than the memorized position are inputted from the control console, as well as controls the driving means according to instructions from the control console to perform automatic sweeping by stepped or continuous movement of the holder.

* * * * *

UNITED STATES PATENT AND TRADEMARK OFFICE
CERTIFICATE OF CORRECTION

PATENT NO. : 4,824,229
DATED : APRIL 25, 1989
INVENTOR(S) : HIROSHI NARITA ET AL

It is certified that error appears in the above-identified patent and that said Letters Patent is hereby corrected as shown below:

On the Title Page, item [75]:

The second inventor's name should read,

--Minoru KAMIMURA--

Signed and Sealed this

Ninth Day of July, 1991

Attest:

HARRY F. MANBECK, JR.

Attesting Officer

Commissioner of Patents and Trademarks